(No Model.)
W. W. BROWN.
INSTRUMENT FOR PLUMBING THE CORNERS OF BUILDINGS.
No. 354,592. Patented Dec. 21, 1886.
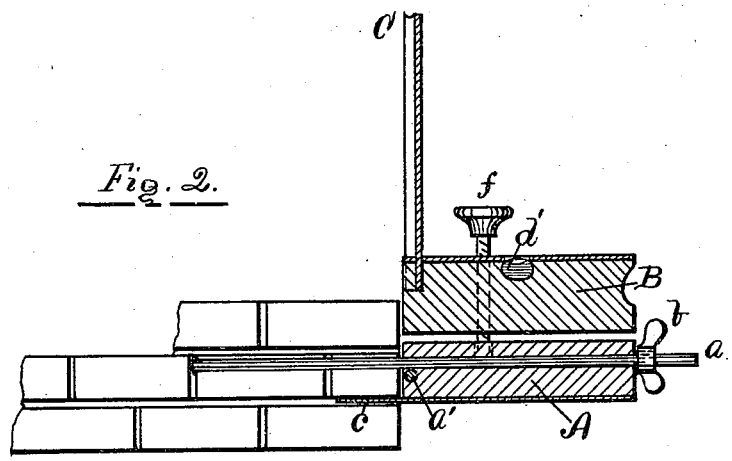
*Fig. 2.*
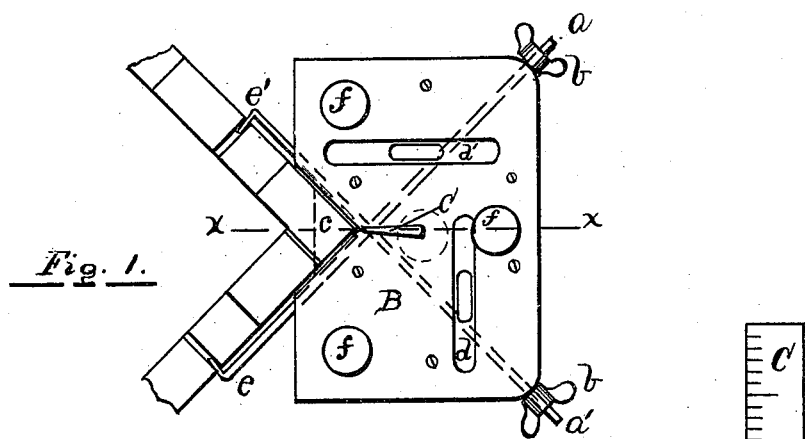
*Fig. 1.*
*Fig. 3.*
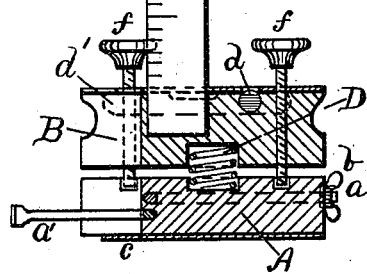
Witnesses.
L. C. Baldwin
Julia A Baldwin
Inventor.
William Wood Brown

UNITED STATES PATENT OFFICE.

WILLIAM WOOD BROWN, OF MANCHESTER, NEW HAMPSHIRE.

INSTRUMENT FOR PLUMBING THE CORNERS OF BUILDINGS.

SPECIFICATION forming part of Letters Patent No. 354,592, dated December 21, 1886.

Application filed June 4, 1886. Serial No. 204,165. (No model.)

*To all whom it may concern:*

Be it known that I, WILLIAM WOOD BROWN, of Manchester, in the county of Hillsborough and State of New Hampshire, have invented a new and useful Improvement in Instruments for Plumbing the Corners of Buildings in Process of Erection.

The following is a specification of my invention.

The object of my invention is to provide a plummet that may be easily clamped upon the angle of a wall, and serve as a guide by which to lay the masonry without the necessity of frequent use of a plumb-rule.

The invention consists of an instrument having a base provided with a clamping mechanism, by means of which it may be securely fastened to the angle of a wall, an upper adjustable table fitted with screws for adjusting the same, and having small spirit-level tubes fixed in its upper surface as guides in adjustment, and a graduated standard at right angles (perpendicularly) with the tubes referred to.

In the accompanying drawings, in which similar letters of reference indicate like parts, Figure 1 is a plan of the instrument attached to a brick wall. Fig. 2 is a vertical diagonal section on a line corresponding with the clamping-rod $a\ e$. Fig. 3 is a vertical cross-section on the line $x\ x$.

In the drawings, A is the base.

$a$ and $a'$ are rods threaded on one end to receive the nuts $b$, and having the other end adapted to enter a joint of the masonry. These rods and nuts serve to securely clamp the instrument to the work. The base-plate $c$ projects a little into the angle to aid in supporting the instrument.

The upper table, B, is fitted with the spirit-level tubes $d$ and $d'$ and carries the upright C, which may be graduated to assist in laying a standard number of courses of masonry to each foot in height.

$f f f$ are thumb-screws used in adjusting the upper table, B, the level position of which is indicated by the bubbles in the tubes $d$ and $d'$. The spring D holds the upper and lower parts of the instrument together, and allows the upper table, B, to be adjusted in any direction by the thumb-screws $f$.

The instrument is used as follows: The base-plate $c$ is inserted in a level joint of the angle of the brick-work, and the hooked ends $e\ e'$ of the clamp-rods are inserted in vertical joints, one on each side of the angle. Then by turning the nuts $b\ b$ the instrument is securely fastened to the angle. The upper table is then brought to a level by use of the screws $f$, its level position being indicated by the bubbles in the tubes $d\ d'$, said tubes being at right angles to each other. The table B when properly adjusted will be level in all directions.

The graduated edge of the standard C being fixed at right angles perpendicularly with both the tubes $d$ and $d'$, it is evident that when the table B is adjusted said edge will be perfectly plumb, and the corner of the wall if laid to said edge will be plumb also.

What I claim is—

In an instrument for plumbing masonry, a base provided with a projecting plate to enter a joint in the angle of the wall, and armed with clamping mechanism consisting of rods adapted at one end to enter joints in the work, and provided at the other end with a threaded portion and a nut working thereon, in combination with an adjustable table provided with adjusting-screws and spirit-level tubes, and carrying a graduated standard fixed at right angles perpendicularly with said tubes, all substantially as shown and described, and for the purpose set forth.

WILLIAM WOOD BROWN.

Witnesses:
LUTHER C. BALDWIN,
JULIA A. BALDWIN.